(12) United States Patent
Koudar

(10) Patent No.: US 7,656,750 B2
(45) Date of Patent: Feb. 2, 2010

(54) ECHO DETECTION

(75) Inventor: Ivan Koudar, Belohorska (CZ)

(73) Assignee: Semiconductor Components Industries, LLC, Oudenaarde (BE)

( * ) Notice: Subject to any disclaimer, the term of this patent is extended or adjusted under 35 U.S.C. 154(b) by 201 days.

(21) Appl. No.: 12/037,838

(22) Filed: Feb. 26, 2008

(65) Prior Publication Data

US 2009/0213696 A1 Aug. 27, 2009

(51) Int. Cl.
*H04B 1/16* (2006.01)
(52) U.S. Cl. .......................... 367/135; 367/99
(58) Field of Classification Search .................. 367/87, 367/99, 135
See application file for complete search history.

(56) References Cited

U.S. PATENT DOCUMENTS 3,796,989 A * 3/1974 Ravas et al. .................. 367/41
3,942,178 A * 3/1976 Hackett ........................ 367/93
4,287,579 A * 9/1981 Inoue et al. .................. 367/94
5,379,770 A * 1/1995 Van Veen .................... 600/455
2001/0012238 A1 8/2001 Iwasaki et al.

OTHER PUBLICATIONS

Echo detection using quadrature zero IF mixer (11 pages).
A Mixed-Signal BiCMOS Front-End Signal (10 pages) Processor for High-Temperature Applications IEEE Journal of Solid-State Circuits, vol. 41, No. 7, Jul. 2006 Ovidiu Vermesan, Member, IEEE, Lars-Cyril Julin Blystad, Member, IEEE, Roy Bahr, Magnus Hjelstuen, Lionel Beneteau, Member, IEEE, and Benoit Froelich, Member, IEEE.

* cited by examiner

*Primary Examiner*—Ian J Lobo
(74) *Attorney, Agent, or Firm*—Workman Nydegger

(57) ABSTRACT

An echo detection circuit that detects an echo by detecting the magnitude of a digitally mixed representation of the received acoustic signal and reference sine and cosine signals. That magnitude is then compared against an echo threshold to verify the presence or absence of an echo signal. A low pass filter with a configurable cut-off frequency may be used to define the selectivity of the echo detector.

16 Claims, 5 Drawing Sheets

400

| Angle | 0° | 45° | 90° |
|---|---|---|---|
| Ideal | 0 | 1/sqrt(2) | 1 |
| Actual | 0 | 1/2+1/4-1/32 => 0.71875 | 1 |

ECHO DETECTION

BACKGROUND OF THE INVENTION

Echo detection involves the creation of an acoustic signal, and detecting the acoustic echo reflected back. The reflected acoustic signal (called the "echo signal" or "echo") is converted into an electrical signal, which may then be processed to extract information. One common application of echo detection is object and position detection. For instance, advanced vehicles often use echo detection to obtain information regarding positioning of objects external to the vehicle. For instance, echo detection may be used to inform a driver who is backing a vehicle up that there is an object behind the vehicle, thereby avoiding harm to the object, or to the external object. This is critical as the object detection works regardless of whether the object is inanimate, an animal, or even a person. Echo detection may also be used to facilitate automatic parking assistance.

Echo detection has been in use for some time. A ceramic resonator is the typical element that is used to both transmit and receive acoustic signals. Specifically, the transmission channel will first use the resonator to generate the acoustic signal. Then the receive channel will use the resonator to detect any reflections of that acoustic signal.

In one conventional implementation, the echo detection is accomplished by having the ceramic resonator generate an electrical signal that corresponds to the sensed acoustic pressures. The electrical signal is then passed through a Low Noise Amplifier (LNA) amplifier, and then through a high quality band pass filter. The filter serves to allow the echo signal to pass, while filtering out much of the unwanted amount noise caused by ambient acoustics in the environment. This unwanted noise can even saturate some of the downstream circuitry. Basically, the conventional approach is based on the direct comparison of the amplified echo envelope with a threshold level via the analog comparator.

The signal may then be passed through a variable gain amplifier in preparation for being provided to an Analog to Digital Converter (ADC). Thus, the acoustic signal or a derivative thereof is converted into a digital signal. The digital signal is then processed to determine whether or not the acoustic signal is truly representative of an echo received from the originally transmitted signal. Conventionally, this may be accomplished using a discrete Fourier transform (DFT) function employing a flat or more complex frequency shaping window. In the case of the flat window, the DFT selectivity is not precise due to its side band ripple. In the case of a more complex window (e.g. a Hann window), the side band ripple is significantly improved, but such a transform implementation is quite complicated and involves significant circuitry.

BRIEF SUMMARY

Embodiments described herein relate to an efficient echo circuit, and more specifically, to a portion of that echo circuit called an echo detection circuit. Echo circuits are often used to detect a position of objects external to the echo circuit. For instance, the echo circuit includes a transmission channel that transmits an acoustic signal using a resonator. The acoustic signal may, but need not, be an ultrasonic acoustic signal.

The echo detection circuit detects any reflecting echo from this transmitted acoustic signal. Based on the timing between the transmission of the acoustic signal, and the detection of the echo from a reflected portion of that signal, certain information regarding the distance or position of an external object that reflected the acoustic signal may be derived. Accordingly, it is important that a valid echo of the transmitted acoustic signal be detected, as distinguished from other acoustics not representing an echo from the transmitted acoustic signal. The echo detection circuit may, but need not, use the same acoustic resonator as the transmitter.

Briefly summarized, in one embodiment, in order to detect an echo, the resonator converts any detected acoustic pressures into a corresponding analog electrical signal. That analog electrical signal is then submitted to some amplification and potentially some selective filtering around the frequency of the transmitted acoustic signal. The processed signal is then converted into a sequence of digital values (i.e., a digital signal) using an analog to digital converter. The oversampling ratio of the analog to digital converter is at least two, but in one example is eight. That digital signal is then mixed using a digital clock signal into a sine and a cosine sequence of digital signals. The digital signal from each branch may then be filtered by a low-pass digital filter to provide selectivity that is independent of the oversampling ratio of the analog to digital converter. This selectivity may be adjustable to thereby easily adjust the bandwidth of the entire echo detection process. The amplitude of the phaser represented by the combined sine and cosine filtered digital signals may then be used to determine whether or not a valid echo has been detected.

In one embodiment, the clock driving the transmission of the acoustic signal, the sampling of the analog to digital converter, and the mixers may be derived using the same master clock. Thus, the frequency of the echo detection process may be altered by simply changing the frequency of the master clock. In addition, another significant consequence of this clock sharing is that the received echo frequency is in the middle of the digitally created band pass filter regardless of temperature aging, and so forth. This is not the case for the conventional approach, where it is hard to accurately track the center frequency of the high Q band pass filter with the received echo frequency. In the case of such a mismatch, the result is sensitivity degradation.

Additional embodiments will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE SEVERAL VIEWS OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
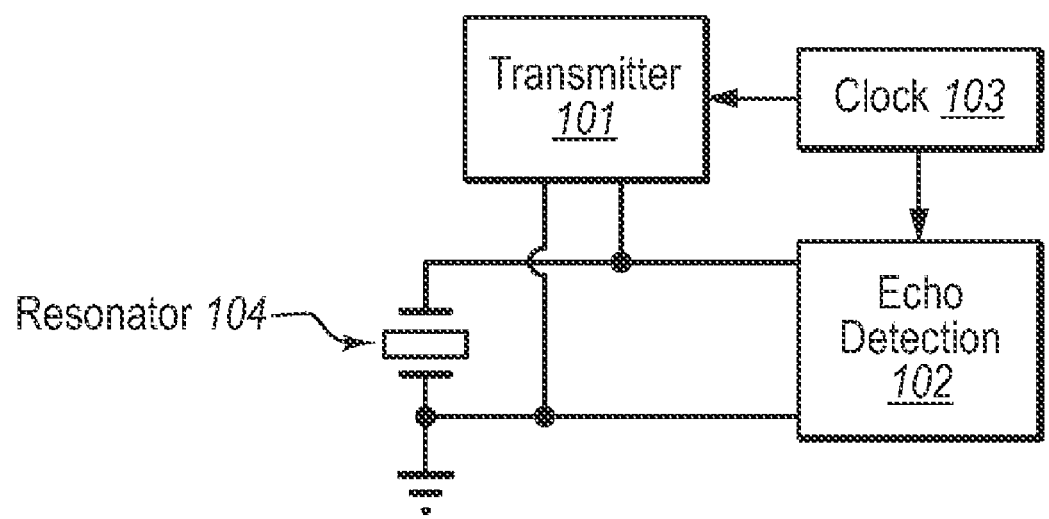
FIG. 1 illustrates an echo circuit that includes an acoustic transmission circuit and an echo detection circuit that both use a resonator, and operate using the same master clock.

Embodiments of the present invention relate to an efficient echo circuit, and more specifically, to a portion of that echo circuit called an echo detection circuit. Echo circuits are often used to detect a position of objects external to the echo circuit. For instance, the echo circuit includes a transmission channel that transmits an acoustic signal using a resonator. The acoustic signal may, but need not, be an ultrasonic acoustic signal.

The echo detection circuit detects any reflecting echo from this transmitted acoustic signal. Based on the timing between the transmission of the acoustic signal, and the detection of the echo from a reflected portion of that signal, certain information regarding the distance and position of an external object that reflected the acoustic signal may be derived. Accordingly, it is important that a valid echo of the transmitted acoustic signal be detected, as distinguished from other ambient acoustics not representing an echo from the transmitted acoustic signal. The echo detection circuit may, but need not, use the same acoustic resonator as the transmitter.

Briefly summarized, in one embodiment, in order to detect an echo, the resonator converts any detected acoustic pressures into a corresponding analog electrical signal. That analog electrical signal is then submitted to some amplification and potentially some low selective filtering around the frequency of the transmitted acoustic signal. The processed signal is then converted into a sequence of digital values (i.e., a digital signal) using an analog to digital converter. The oversampling ratio of the analog to digital converter is at least two, but in one example is eight. That digital signal is then mixed using a digital clock signal into a sine and a cosine sequence of digital signals. The digital signal from each branch may then be filtered by a low-pass digital filter to provide selectivity that is independent of the oversampling ratio of the analog to digital converter. This selectivity may be adjustable to thereby easily adjust the bandwidth of the entire echo detection process. The amplitude of the phaser represented by the combined sine and cosine filtered digital signals may then be used to determine whether or not a valid echo has been detected.

In one embodiment, the clock driving the transmission of the acoustic signal, the sampling of the analog to digital converter, and the mixers may be derived using the same master clock. Thus, the frequency of the echo detection process may be altered by simply changing the frequency of the master clock. In addition, another significant consequence of this clock sharing is that the received echo frequency is in the middle of the digitally created band pass filter regardless of temperature aging, and so forth. This is not the case for the conventional approach, where it is hard to accurately track the center frequency of the high Q band pass filter with the received echo frequency. In the case of such a mismatch, the result is sensitivity degradation.

Having briefly summarized an example operation of the echo circuit, further features and advantages of the echo detection will become clarified by the more detailed description of an example echo circuit that will be described with reference to FIG. 1 and subsequent figures. Other features and advantages will become apparent to those of ordinary skill in the art after having read this description.

FIG. 1 illustrates an echo circuit 100 in simplified form. The echo circuit includes a resonator 104 that is shared by a transmitter 101 and an echo detection circuit 102, although the broader principles described herein are not limited to a shared resonator configuration. The transmitter 101 and the receiver 102 may indeed have their own dedicated resonators. The transmitter 101 and the receiver 102 are, in one embodiment, driven by the same master clock 103.

The transmitter 101 transmits an acoustic signal using the resonator 104, and then becomes dormant for a brief period, while the transmitted acoustic signal is given a chance to propagate into the environment. If there are objects within a certain range of that resonator 104, an echo of this transmission may be detected by having the echo detection circuit 102 analyze acoustic signals that have been converted into electrical signals using the resonator 104. Based on the time between transmission and the detection of the transmitted signal's echo (hereinafter also referred to as an "echo"), information regarding the position of environmental objects may be derived. The transmission circuit 101 is not the focus of the detailed embodiments described in FIG. 2 and subsequent figures. Rather, FIG. 1 is provided merely to provide an overall environment of an echo circuit, and to show that the transmitter 101 and the echo detection circuit 102 may share the same master clock 104.

Figure 2:
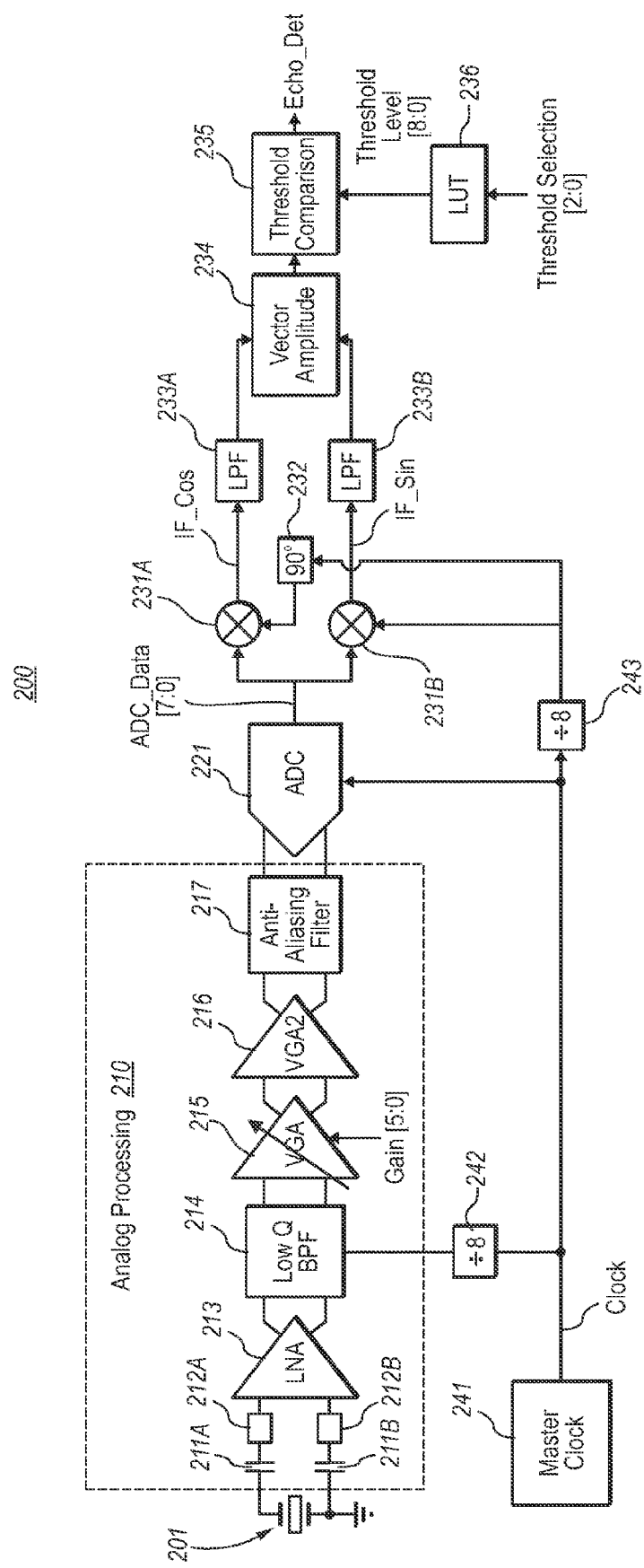
FIG. 2 schematically illustrates an example echo detection circuit that uses vectors in the frequency domain to detect echoes.

FIG. 2 illustrates a more detailed schematic of an example echo detection circuit 200. The echo detection circuit 200 includes a resonator 201. If the echo detection circuit 200 were an embodiment of the echo detection circuit 102 of FIG. 1, then the resonator 201 is an example of the resonator 104 of FIG. 1. The resonator 201 may be, for example, a ceramic resonator. The resonator 201 serves to convert dynamic acoustic pressures (i.e., sound if in the audible range, or other sounds outside of the audible range) that are impinging upon the resonator 201 into corresponding electrical signals. The resonator 201 may have some frequency selectivity associated with it. In other words, the resonator 201 may convert acoustic pressures of some frequencies into electrical signals more efficiently than acoustic pressures at other frequencies. The resonator 201 should, however, be able to convert acoustic pressures at the carrier frequency of the transmitted acoustics signal.

The resonator 201 may be operating in a particular environment in which the resonator 201 may sense acoustic pressures that are not a result of the reflected echo of the transmitted acoustic signal. For instance, if the resonator is operating as part of a vehicle position sensor, the resonator might pick up traffic noise, people talking, dogs barking, horns honking, and the like. In addition, acoustics representing an echo from the transmitted acoustic signal may also be present. It is the presence of such an echo that the echo detector 200 is to detect in spite of the presence of the ambient acoustics.

The ability to distinguish between the echoes and the ambient acoustics rests on the knowledge that the transmitted acoustic signal was transmitted at a particular frequency. That frequency may be ultrasonic. In the example embodiment described herein, the example frequency that will often be used is 50 kilohertz. That said, one of the benefits of some embodiments described herein is the ability to operate the same at a variety of frequencies without substantive change to the circuit. Accordingly, the use of the 50 kilohertz frequency should be construed as an example only.

Referring back to FIG. 2, the electrical signal produced by the resonator 201 is provided to analog processing circuitry 210. The analog processing circuit 210 serves to appropriately amplify the input electrical signal, and also optionally to provide some further low selectivity filtering of ambient acoustics. The specifics of the analog processing circuit 210 are provided as an example only of how such analog processing may be achieved. However, the specifics of the analog processing circuit 210 should be viewed as an example only, and not limiting the broader principles as described and claimed herein.

First, the input analog electrical signal is Alternating Current (AC) coupled to the remainder of the processing circuitry through capacitors 211A and 211B. Further resistors 212A and 212B are provided for appropriate impedance matching into a low noise amplifier 213. These resistor 212A and 212B may also be part of the input Electro Static Discharge (ESD) protection and clamping circuitry to protect the sensitive Low Noise Amplifier input, to thereby protect against high voltage peaks. The low noise amplifier pre-amplifies a signal from the ultrasonic sensor and specifies a total noise figure. An example schematic of a low noise amplifier that may serve as the low noise amplifier 213 can be found in FIG. 6 of the following article: "A Mixed-Signal BiCMOS Front-End Signal Processor for High-Temperature Applications" by O. Vermesan et al, pp 1638-1647 of IEEE JOURNAL OF SOLID-STATE CIRCUITS, VOL. 41, No. 7, JULY 2006.

Frequency response is not critical for the low noise amplifier 213, because this amplifier does not introduce any significant selectivity. In one embodiment, the Gain BandWidth (GBW) of this amplifier 213 is, for example, 12 megahertz with a Direct Current (DC) gain equal to about 40 dB to 45 dB, and a cut-off frequency at approximately 80 kHz. In other words the amplifier 213 gain is sensibly constant up to a frequency of approximately 80 kHz, where the first pole is encountered. In sum, the low noise amplifier amplifies the input electrical signal with some small amount of noise introduction.

The amplifier signal is then provided to a bandpass filter 214. The bandpass filter does serve to pass signals that are of the same frequency as the transmitted acoustic signal, and thus would allow electrical signals representing any echo to pass. However, other frequencies may be attenuated to varying degrees. Unlike conventional echo detection circuits, however, the bandpass filter 214 is not relied upon as the dominant selectivity component. Accordingly, the quality of the bandpass filter 214 may be low quality. Essentially, the bandpass filter 214 is provided so that downstream circuitry is not saturated due to electrical signals resulting from ambient noise that is not an echo. In some embodiments, the bandpass filter 214 may be entirely eliminated if the selectivity of the resonator 201 is sufficient to given adequate assurance that downstream circuitry will not be saturated. In one embodiment, the bandpass filter 214 operates using the same master clock 241 (albeit with some frequency division performed by frequency divider 242) that was used to transmit (also performed with the same frequency division), drive the sampling rate of the analog to digital converter, and perform mixing. Because the accuracy of the low Q BPF is not critical, another embodiment of the low Q BPF 214 can be realized in the continuous time domain, in which case the clock divider 242 can be omitted.

Figure 7:
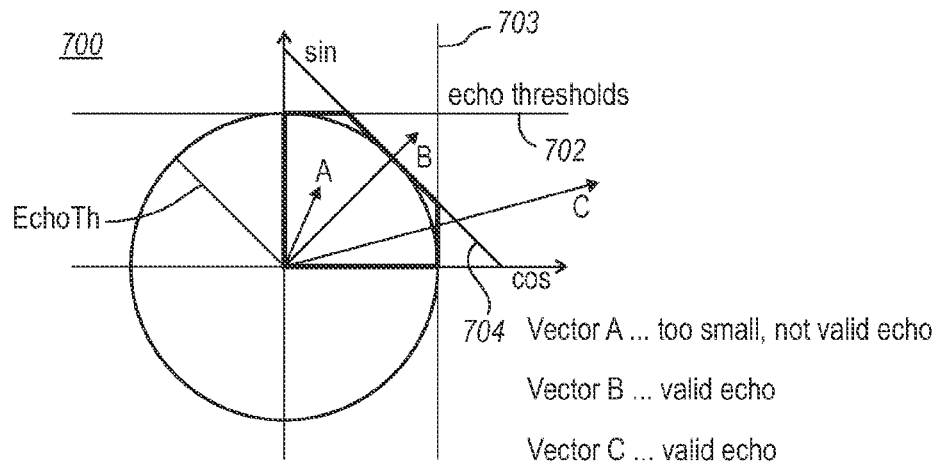
FIG. 7 illustrates a vector threshold comparison graph used to perform threshold detection in accordance with one embodiment.

The filtered analog electrical signal may then be provided to a variable gain amplifier 215, in which the analog gain is set by six bits GAIN[5:0] to meet the analog to digital converter dynamic range. An example of a suitable variable gain amplifier that may serve as the variable gain amplifier 215 is shown in FIG. 7 in the following article: "A Mixed-Signal BiCMOS Front-End Signal Processor for High-Temperature Applications" by O. Vermesan et al, pp 1638-1647 of IEEE JOURNAL OF SOLID-STATE CIRCUITS, VOL. 41, NO. 7, JULY 2006.

The primary function of the variable gain amplifier 215 is to provide variable gain as controlled via a digital interface. This variable gain serves to modify the overall front-end gain and adapt it to the particular resonator sensitivity. In one embodiment, the bandpass filter 214 is incorporated into the variable gain amplifier 215. Although not critical, the Q equals three in one embodiment. In one embodiment, the bandpass filter center frequency is the square root of the product of the maximum echo frequency times the minimum echo frequency in accordance with the following Equation 1:

$$f\_BPF = \sqrt{f\_echo\_max * f\_echo\_min} \quad (1)$$

where, f_BPF is the bandpass filter center frequency, f_echo_max is the maximum echo frequency, and f_echo_min is the minimum echo frequency.

The maximum and minimum echo frequencies define a window within which the echo frequency is expected to be. For instance, if the echo frequency is centered around 50 kilohertz, the echo frequency might vary several percentages up or down from that center frequency.

The filtered analog signal is then provide to a second stage 216 of the variable gain amplifier. In one embodiment, the bandpass filter has a gain of 20 dB, the second stage amplifier has a gain of 8 dB, and the variable gain amplifier 215 has a variable gain as dictated by bits GAIN[5:0].

The amplified signal is then provided to an Anti-Aliasing filter 217. The filter 217 suppresses aliasing frequencies that would be transformed to the modulation band of the transmitted signal. For instance, if the carrier frequency of the transmitted acoustic signal was 50 kilohertz, the sample and hold frequency of the analog to digital converter was 400 kilohertz, there might be reflections in the following bands: 350, 450, 750, 850 kilohertz and so forth. The anti-aliasing filter 217 attenuates those reflected bands by acting as a low pass filter. An example of low-pass filter that may serve as the anti-aliasing filter 217 of FIG. 2 is given in the following article: "A low-power high-linearity CMOS baseband filter for wideband CDMA applications" by Chunlei Shi et al. pp II-152 to II-155, ISCAS 2000 IEEE International Symposium on Circuits and Systems, May 28-31, Geneva, Switzerland.

As for this example, this completes the pre-processing of the analog signal prior to the signal being provided to the analog to digital converter 221 for sampling. The analog processing circuitry 210 is provided for illustrative purposes only, and not by way of restricting the principles of the present invention.

The analog to digital converter 221 samples the analog signal at a particular oversampling rate. In one embodiment, the sampling is controlled by the master clock 241, which also controls the transmission of the acoustic signal, the bandpass filter 214, and the mixers 231A and 231B. Once again, this permits the entire frequency of the echo signal to be changed by merely replacing or adjusting the master clock 241, rather than redesigning the circuit. The "oversampling ratio" of the analog to digital converter 221 is defined as the ratio of the sampling frequency of the converter 221 to the carrier frequency of the transmitted acoustic signal. The oversampling ratio should be at least two in order to satisfy the well-known Nyquist criteria. In one embodiment, the oversampling ratio is eight. For instance, if the carrier frequency of the transmitted acoustic signal is 50 kilohertz, the sampling rate of the analog to digital converter would be 400 kilohertz to support an oversampling ratio of eight. The selection of an oversampling ratio of eight provides some useful benefits that will be explained further below.

In the illustrated embodiment, the analog to digital converter converts the analog signal detected at each sample time into an eight bit signed $1^{st}$ complement code. The signed $1^{st}$ complement code may be quickly generates using analog to digital structures, because the sign bit is generated by simply identifying the polarity of the input signal. The remainder of the bits represent magnitude and can be determined in the same manner regardless of the polarity. The only difference would be any non-sign bits generated for a positive number would be inverted to obtain the negative of that number.

It is desirable that the analog to digital converter be fast enough for the application of the echo detector. Any analog to digital converter that is fast enough will suffice. Furthermore, although the analog to digital converter is described as generating a signed value in one compliment, a signed value using the more common $2^{nd}$ complement will also suffice. As illustrated, the analog to digital converter 221 generates the digital output in the form of eight bits ADC_Data[7:0], which bits are provided to a corresponding mixers 231A and 231B to formulate a cosine branch of the digital processing, and a sine branch of the digital processing.

The mixer 231B of the sine branch is provided with a digital clock signal that operates at 50 kilohertz (note the presence of frequency divider 243 between the master clock 241 and the mixers 231A and 231B), but performs multiplication of its input signals every 400 kilohertz to perform 8 multiplications every period of the input waveforms. Thus, the mixer 231B multiplies a 50 kilohertz digital (with some frequency dispersion) signal by a 50 kilohertz digital signal. The result will be a digital signal that has some DC and low frequency value, and some higher frequency values at 100 kilohertz. The DC and low frequency values represent the baseband signal representing information conveyed in the detected acoustic pressures at around the carrier frequency of the transmitted acoustic signal. The resulting mixed signal is represented by IF_Sin in FIG. 2.

The mixer 231A may be structured and operate similar to the mixer 231B. The only difference might be that the digital clock signal is passed through a 90 degree phase shifter 232. The resulting mixed signal is represented by IF_Cos in FIG. 2. Once again, the mixed signal may have DC and low frequency components resulting from mixing two signals that are close in frequency. Also, the signal will have a higher frequency harmonic at twice the carrier frequency at 100 kilohertz.

Figures 3, 4:
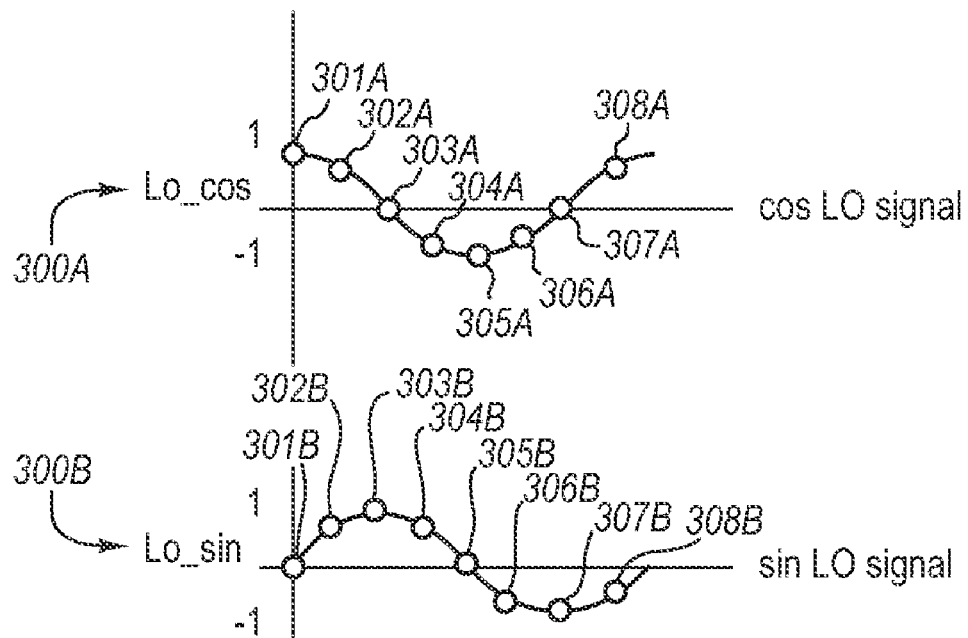
FIG. 3 illustrates various discrete digital points of a sine and cosine digital oscillator.
FIG. 4 illustrates a lookup table that may be used to construct the sine and cosine oscillators of FIG. 3.

FIG. 3 illustrates the digital values that may be produced in order to provide the 50 kilohertz clock signal to a digital mixer that performs multiplication at 400 kilohertz. The clock signal provided to the sine branch mixer 231B is illustrated as LO_sin and 300B in FIG. 3. The bubbles represent the value of the clock signal provided to the mixer 231B for each multiplication. The clock signal provided to the cosine branch mixer 231A is illustrated as LO_cos and 300A in FIG. 3. The bubbles represent the value of the clock signal provided to the mixer 231A for each multiplication.

For instance, at a first multiplication, the value cosine(0 degrees) or 1 represented by point 301A is provided to cosine mixer 231A, and the value sine(0 degrees) or 0 represented by point 301B is provided to sine mixer 231B.

In a second multiplication, the value cosine(45 degrees) or sqrt(½) represented by point 302A is provided to cosine mixer 231A, and the value sine(45 degrees) or sqrt(½) represented by point 302B is provided to sine mixer 231B.

In a third multiplication, the value cosine(90 degrees) or 0 represented by point 303A is provided to cosine mixer 231A, and the value sine(90 degrees) or 1 represented by point 303B is provided to sine mixer 231B.

In a fourth multiplication, the value cosine(135 degrees) or minus sqrt(½) represented by point 304A is provided to cosine mixer 231A, and the value sine(135 degrees) or sqrt(½) represented by point 304B is provided to sine mixer 231B.

In a fifth multiplication, the value cosine(180 degrees) or minus 1 represented by point 305A is provided to cosine mixer 231A, and the value sine(180 degrees) or 0 represented by point 305B is provided to sine mixer 231B.

In a sixth multiplication, the value cosine(225 degrees) or minus sqrt(½) represented by point 306A is provided to cosine mixer 231A, and the value sine(225 degrees) or minus sqrt(½) represented by point 306B is provided to sine mixer 231B.

In a seventh multiplication, the value cosine(270 degrees) or 0 represented by point 307A is provided to cosine mixer 231A, and the value sine(270 degrees) or minus 1 represented by point 307B is provided to sine mixer 231B.

In an eighth multiplication, the value cosine(315 degrees) or sqrt(½) represented by point 308A is provided to cosine mixer 231A, and the value sine(315 degrees) or minus sqrt(½) represented by point 302B is provided to sine mixer 231B.

These same eight values 301A through 308A are provided to the cosine mixer 231A, while at the same time the same eight values 301B through 308B are provided to the sine mixer 231B, such that they repeat over an over at a frequency of 50 kilohertz.

Note that the same values are repeated provided to the mixers. In particular, the values 1, sqrt(½), 0, minus sqrt(½) and −1 are repeated used. The clock may thus be implemented as a lookup table with some logic to identify which value is to be provided to the mixer upon detecting each 400 kilohertz clock period. The lookup table may be reduced to a mere 3 values; namely 1, sqrt(½), and 0, if the lookup table logic is able to place an appropriate sign in response to its prior context.

FIG. 4 illustrates such a lookup table 400. At a 0 degree angle, the ideal value for the sine mixer would be zero, which may be represented in 8 bit signed $1^{st}$ complement as 00000000. At a 45 degree angle, the ideal value for the sine mixer would be 1/sqrt(2) or sqrt(½). That number cannot be ideally represented. In 8 bit signed ones compliment, that number might be approximated as 01011100. At a 90 degree angle, the ideal value for the sine mixer would be one, which may be represented in 8 bit $1^{st}$ complement as 01111111. An example of digital oscillators with sine and cosine samples stored in a ROM is given in the following article: "A 200 MHz Quadrature Digital Synthesizer/Mixer in 0.8 pm CMOS" by Loke Kun et al IEEE JOURNAL OF SOLID-STATE CIRCUITS, VOL. 30, NO. 3, MARCH 1995, pp 193-200.

Evaluated in the frequency domain, the mixed cosine signal IF_Cos and the mixed sine signal IF_Sin include DC components or close to DC low-frequency components. The signals IF_Cos and IF_Sin also include a frequency at about 100 kilohertz (assuming two 50 kilohertz signals provided to the mixers). In order to filter out the higher frequency components, each of the signals IF_Cos and IF_Sin are provided to corresponding low pass filters 233A and 233B.

The low pass filters 233A and 233B also serve to define the dominant selectivity of the entire echo detection circuit 200. For instance, if the filters 233A and 233B have a cut-off frequency at 10 kilohertz, that would define a window of 40 to 60 kilohertz in which the echo signal might appear. If the filters 233A and 233B have a cut-off frequency at 2 kilohertz, that would define a window of 48 to 52 kilohertz in which the echo signal might appear. The selection of this window size is a function of the cut-off frequency of the low pass filters 233A and 233B, and is not a function of the oversampling ratio as in the conventional Discrete Fourier Transform (DFT) method for performing echo detection. In that conventional DFT method, the echo detection frequency window becomes smaller as the oversampling ratio of the analog to digital converter increases.

In one embodiment, the cut-off frequency of the low pass filters 233A and 233B is configurable, thereby allowing the echo detection window to be configurable. This is helpful as not all applications of echo detection might benefit through the use of the same echo detection window. For instance, echo detection in which there might be significant Doppler effect might require a greater echo detection window since higher speeds might cause some frequency shift of the echo signal as compared to the frequency at which the acoustic signal was originally transmitted. Some embodiments can also vary the cut off frequency in time and thus provide a variable selectivity based on the obstacle distance. This enables an improved detection of small distant obstacles, where the received echo SNR (signal to noise ratio) is less than 0 dB. Furthermore, in some embodiments, there might be some frequency shifting caused by the transmission circuitry and/or the echo detection circuit itself, or perhaps by an aging resonator.

Figure 5:
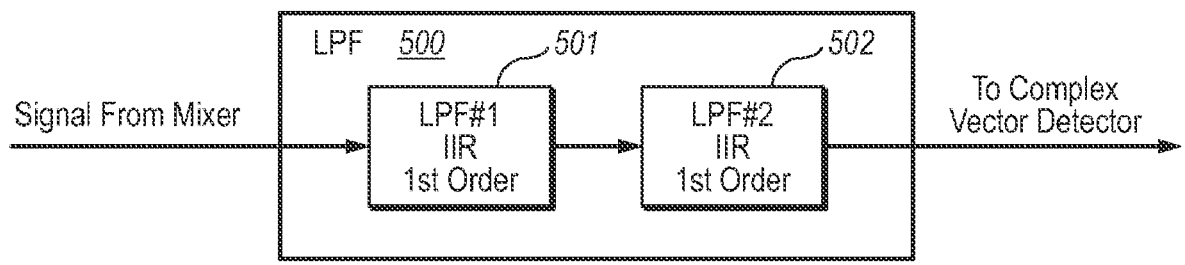
FIG. 5 illustrates a low pass filter constructed of two first order Infinite Impulse Response (IIR) filters that may be used to define the selectivity of the echo detection process.
Figure 6:
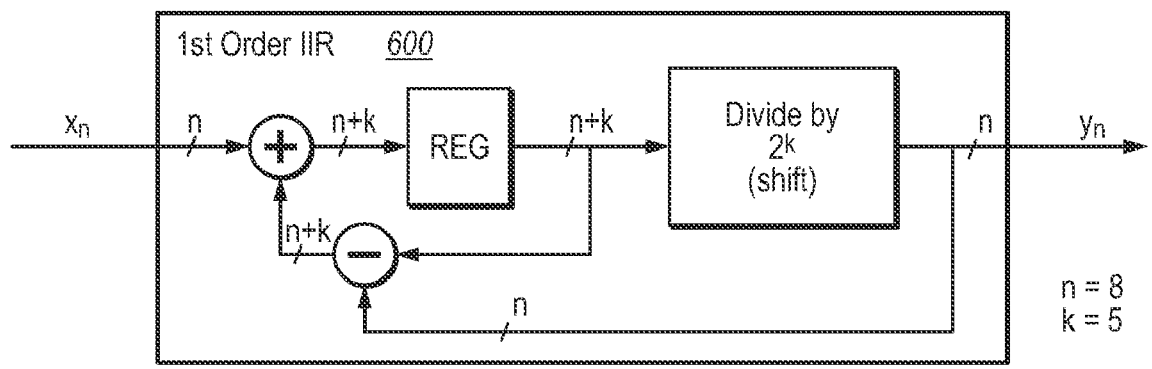
FIG. 6 illustrates a first order IIR filter that may be used for each of the two first order IIR filters of FIG. 5.

FIG. 5 illustrates an example of a digital low pass filter 500 that may be used to implement the low pass filters 233A and 233B of FIG. 2. The configurable cut-off digital low pass filter 500 is implemented as a series combination of first order Infinite Impulse Response (IIR) filter 501, which represented a first low pass filter, and first order IIR filter 502. IIR filters are known in the art. Nevertheless, for the sake of completeness in describing a specific example, FIG. 6 illustrates a first order IIR filter 600, which may serve as either of the IIR filters 501 and 502 of FIG. 5. Since IIR filters such as the IIR filter 600 are well known in the art, the detailed operation of the IIR filter 600 will not be described. Suffice it to say that the IIR filter 600 receives an n-bit input value (represented as $x_n$) and generates an n-bit output value (represented as $y_n$). In the example embodiment, n is 8 since the filtering is applied to an 8-bit value. In one embodiment, the value of k is 5.

In this configuration, the IIR filter equation is as follows in Equation 2:

$$y_{n+1} = y_n \cdot \left(1 - \frac{1}{2^k}\right) + x_n \cdot \frac{1}{2^k} \quad (2)$$

Frequency response of single IIR filter approximately is given by the following Equation 5:

$$f_{-3dB} \cong \frac{f_s \cdot 2^{-k}}{2\pi} \quad (3)$$

In the example, in which the sampling frequency fs is equal to 400 kilohertz, and in which k is 5, the cut-off frequency $f_{-3dB}$ is 2 kilohertz. Note that the selectivity window may be made twice as narrow by making k equal to 6. For each time k is incremented by one, the selectivity window size is reduced by half. On the other hand, to double the selectivity window, k may be decreased by one. Thus, the selectivity window is configurable by selecting an appropriate value for k in the IIR filters. Thus, the selectivity of the echo detection process may be dominated by the low pass filters 233A and 233B.

The output signals from cosine and sine low-pass filters 233A and 233B form a complex vector. The amplitude of this vector is approximately the amplitude of the echo signal. The amplitude of the complex vector is defined by the following Equation 4:

$$A = \sqrt{A_{\sin}^2 + A_{\cos}^2} \quad (4)$$

where $A_{cos}$ is the amplitude of the signal provided by the mixer 233A, and $A_{sin}$ in is the amplitude of the signal provided by the mixer 233B Ideally, the amplitude would then be detected against a particular threshold. If the value was greater than that threshold, then the echo has been detected. In other words, if the vector reaches out of circle with "echo threshold" radius, then echo detection would be detected. FIG. 7 illustrates a vector graph showing a circle 700 having a radius EchoTh. To strictly evaluate Equation 4, however, a large amount of chip area would be required.

Accordingly, in one embodiment, one quadrant of the circle 701 is approximated by a simpler geometric object as square with cut corners. That object is defined by sine threshold 702, cosine threshold 703, and diagonal threshold 704.

From there, the comparison is done fully in digital. The sine and cosine components are represented by the digital values coming from filter 233B and 233A, respectively. The less computationally intensive threshold detection performs the following steps as represented in the method 800 of the flowchart of FIG. 8.

First, the absolute values of sine and cosine signals are calculated (act 801), thus transforming all possible vectors to the first quadrant. Since the signals are represented in $1^{st}$ complement, the most significant bit (the sign bit) may be simply discarded, resulting directly in an absolute value of the number. If the number was negative, the rest of the bits would be simply inverted.

Figure 8:
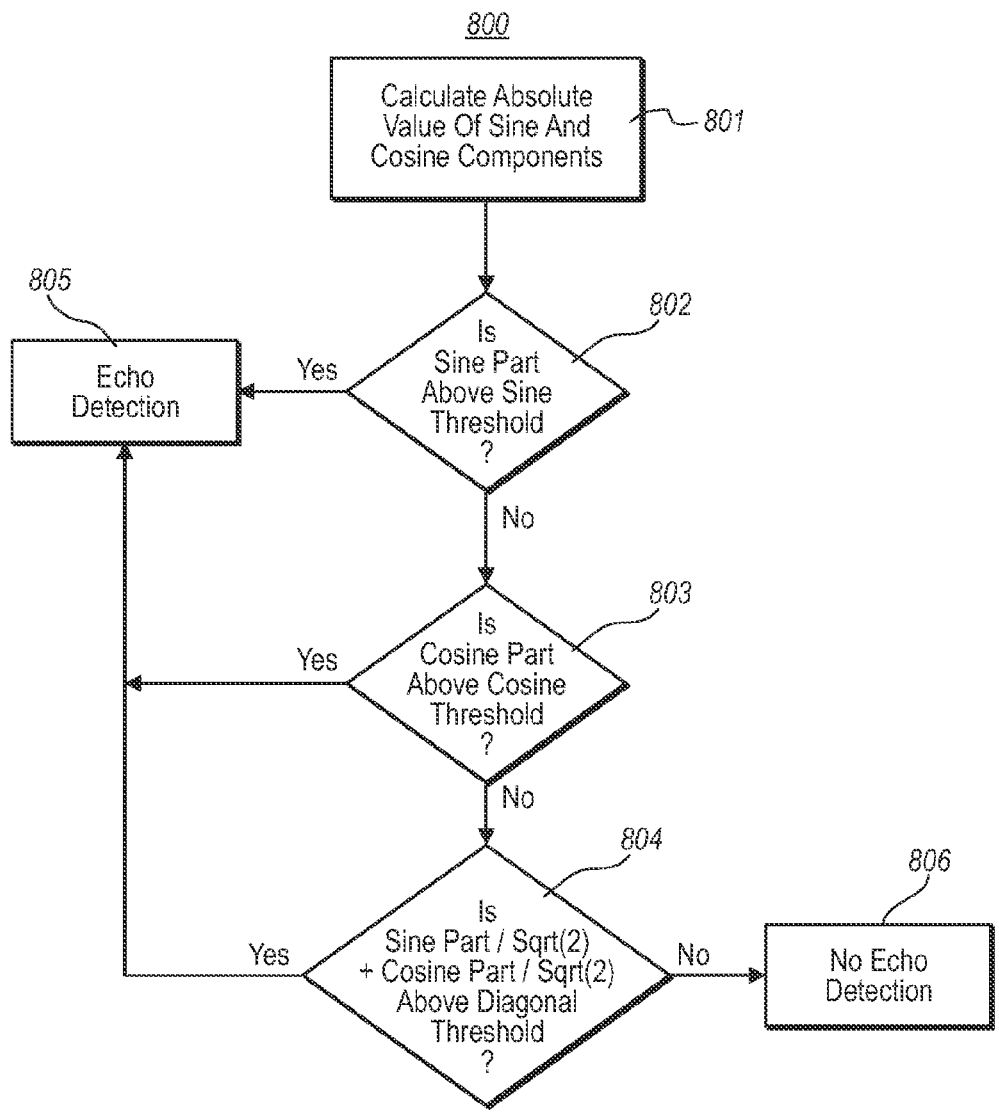
FIG. 8 illustrates a flowchart of a method for detecting echoes through threshold comparison.

The remainder of the acts 802 may be performed in series as shown in FIG. 8, if there were just one digital comparator available for the threshold comparison. Alternatively, they may be performed in parallel if there are three comparators, one for each threshold value 702, 703 and 704.

The threshold detection detects whether the sine part of the vector (i.e., the absolute value of the digital value received from the filter 233B) is above the sine threshold 702 (decision block 802). If performed in series, and the sine component exceeds the threshold (Yes in decision block 802), then an echo is detected (act 805).

Otherwise (No in decision block 802), it is determined whether the cosine part of the vector (i.e., the absolute value of the digital value received from filter 233A) is above the cosine threshold 703 (decision block 803). If performed in series, and the cosine component exceeds the threshold (Yes in decision block 803), then the echo is detected (act 804).

Otherwise (No in decision block 803), it is determined whether the value ("cos part"/sqrt(2)+"sin part"/sqrt(2)) is above the diagonal echo threshold 704 (decision block 804)). If so (Yes in decision block 804), echo is detected (act 805). Otherwise (No in decision block 804), no echo is detected (act 806).

If the acts 802 through 804 were instead performed in parallel, the results of the threshold comparisons may be logically OR'ed such that a resulting one would represent that one or more of the threshold detects evaluated to be true. This would result in an echo detection.

By approximating the echo detection using these three thresholds 702, 703 and 704, rather than by using the circle 701, the size of the threshold comparison circuit may be significantly reduced while increasing the speed of the threshold detection. The error caused by this approximation is very low (approximately 0.7 dB), which does not impact the overall sensitivity to a significant degree. Referring to FIG. 2, the vector amplitude component 234 may determine the absolute values of the sine and cosine components received from the filters 233B and 233A, respectively. The threshold comparison circuit 235 performs the threshold comparison algorithm of FIG. 8.

As a final matter, note the presence of the look up table 236, which provides different threshold values (represented by 9 bit number Threshold_Level[8:0]) depending on the threshold selection data Threshold_Selection [2:0]. This recognizes the fact that as time passes from the time that the acoustic signal was transmitted, one might expect the echo signal to be fainter and fainter. This is because shorter times to echo means that the echo was reflected off a closer object, and thus can be expected to be a louder echo. Longer times to echo, on the other hand, means that the echo reflected off a more distant object, and thus can be expect to be fainter. As time passes from the original transmission, therefore, the threshold levels for echo detection become steadily lower. At some point, if no echo is detected, the acoustic signal may be retransmitted, and echo detection performed once again.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. An echo detection circuit comprising:
    an acoustic sensor configured to convert sensed acoustic pressures into a pre-processed analog electrical signal;
    analog processing circuitry configured to transform the pre-processed analog electrical signal into a post-processed analog electrical signal suitable for providing to an analog-to-digital converter;
    an analog to digital converter configured to convert the post-processed analog electrical signal into a digital signal;
    a sine mixer configured to digitally mix the digital signal provided by the analog to digital converter with a sine wave of approximately the same frequency as a carrier wave of a transmitted acoustic signal whose echo is being detected;
    a cosine mixer configured to digitally mix the digital signal provided by the analog to digital converter with a cosine wave of approximately the same frequency as the carrier wave of the transmitted acoustic signal whose echo is being detected;
    a vector magnitude detection mechanism that detects a magnitude of the vector represented by at least a derivative of a signal received from the sine mixer, and at least a derivative of a signal received from the cosine mixer; and
    a threshold detection circuit that compares the magnitude of the vector with one or more thresholds to determine whether or not an echo is detected.

2. An echo detection circuit in accordance with claim 1, further comprising:
    a sine low pass filter positioned between the sine mixer and the vector magnitude detection mechanism; and
    a cosine low pass filter position between the cosine mixer and the vector magnitude detection mechanism.

3. An echo detection circuit in accordance with claim 2, wherein the sine low pass filter and the cosine low pass filter are each configured as a series of one or more first order Infinite Impulse Response (IIR) filters.

4. An echo detection circuit in accordance with claim 3, wherein the sine low pass filter and the cosine low pass filter are each configured as a series of two first order Infinite Impulse Response (IIR) filters.

5. An echo detection circuit in accordance with claim 2, wherein the vector magnitude detection mechanism detects the magnitude of the vector represented by the filtered signal received from the sine mixer and the filtered signal received from the cosine mixer.

6. An echo detection circuit in accordance with claim 2, wherein the sine low pass filter has a configurable cut-off frequency.

7. An echo detection circuit in accordance with claim 6, wherein the cosine low pass filter has a configurable cut-off frequency.

8. An echo detection circuit in accordance with claim 7, wherein the cut-off frequency of the sine low pass filter is configured to approximately be the same as the cut-off frequency of the cosine low pass filter.

9. An echo detection circuit in accordance with claim 1, wherein the cosine wave represents a digital signal that represents digital values generated by a look up table.

10. An echo detection circuit in accordance with claim 1, wherein the threshold detection circuit compares the magnitude of the vector with one or more thresholds by performing the following:
    an act of determining whether a sine component of the vector is above a sine threshold value;
    an act of determining whether a cosine component of the vector is above a sine threshold value;
    an act of determining whether the vector exceeds a diagonal threshold.

11. An echo detection circuit in accordance with claim 10, wherein the three acts of determining are performed in parallel.

12. An echo detection circuit in accordance with claim 10, wherein the threshold detection circuit detects an echo if any of the acts of determining result in the corresponding threshold being exceeded.

13. An echo detection circuit in accordance with claim 1, wherein the analog to digital converter samples the post-processed analog electrical signal at an oversampling rate of eight compared to the frequency of a transmitted acoustic signal.

14. An echo detection circuit in accordance with claim 1, wherein the one of more thresholds used by the threshold detection circuits are configurable.

15. An echo circuit comprising:

a resonator;

an acoustic transmitter that is configured to transmit an acoustic signal at a particular frequency;

an echo detection circuit that uses the resonator to convert detected acoustic pressures and convert such pressures into an analog signal that may be used to detect echoes from the acoustic signal transmitted by the acoustic transmitter, the echo detection circuit comprising:

an analog to digital converter configured to convert at least a derivative of the analog signal into a digital signal;

a sine mixer configured to digitally mix the digital signal provided by the analog to digital converter with a digital sine wave;

a cosine mixer configured to digitally mix the digital signal provided by the analog to digital converter with a digital cosine wave;

a vector magnitude detection mechanism that detects a magnitude of the vector represented by at least a derivative of a signal received from the sine mixer, and at least a derivative of a signal received from the cosine mixer; and a threshold detection circuit that compares the magnitude of the vector with one or more thresholds to determine whether or not an echo is detected; and a clock configured to control the transmission frequency of the acoustic transmitter, the oversampling ratio of the analog to digital converter, and the mixing rate of the sine mixer and the cosine mixer.

16. An echo circuit in accordance with claim 15, wherein the resonator is shared by the acoustic transmitter and the echo detection circuit.

\* \* \* \* \*

UNITED STATES PATENT AND TRADEMARK OFFICE
CERTIFICATE OF CORRECTION

PATENT NO.       : 7,656,750 B2                              Page 1 of 1
APPLICATION NO.  : 12/037838
DATED            : February 2, 2010
INVENTOR(S)      : Koudar It is certified that error appears in the above-identified patent and that said Letters Patent is hereby corrected as shown below:

Column 6
Line 36, change "is then provide to" to --is then provided to--

Column 7
Line 17, change "generates" to --generated--

Column 7
Line 32, change "to a corresponding" to --to corresponding--

Column 8
Line 43, change "are repeated provided" to --are repeatedly provided--

Column 8
Line 45, change "are repeated used" to --are repeatedly used--

Column 10
Line 8-9, change "$f_{-3dB}$" to --$f_{-3dB}$--

Column 10
Line 40, change "circle 701" to --circle 700--

Column 11
Line 20, change "701" to --700--

Signed and Sealed this

Twenty-first Day of December, 2010

David J. Kappos
*Director of the United States Patent and Trademark Office*